United States Patent
Lee et al.

(10) Patent No.: US 10,688,869 B2
(45) Date of Patent: Jun. 23, 2020

(54) APPARATUS FOR CONTROLLING BATTERY STATE OF CHARGE, SYSTEM HAVING APPARATUS FOR CONTROLLING BATTERY STATE OF CHARGE, AND METHOD FOR CONTROLLING BATTERY STATE OF CHARGE

(71) Applicants: HYUNDAI MOTOR COMPANY, Seoul (KR); KIA MOTORS CORPORATION, Seoul (KR)

(72) Inventors: Seung Yoon Lee, Seoul (KR); Gun Hyung Park, Busan (KR); Kyu Il Lee, Yongin-si (KR); Dae Jong Kim, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 53 days.

(21) Appl. No.: 15/655,348

(22) Filed: Jul. 20, 2017

(65) Prior Publication Data

US 2018/0312073 A1    Nov. 1, 2018

(30) Foreign Application Priority Data

Apr. 26, 2017  (KR) .................. 10-2017-0053825

(51) Int. Cl.
*B60L 58/12*  (2019.01)
*B60L 1/00*  (2006.01)
(Continued)

(52) U.S. Cl.
CPC ............. *B60L 1/003* (2013.01); *B60L 50/72* (2019.02); *B60L 50/75* (2019.02); *B60L 58/12* (2019.02);
(Continued)

(58) Field of Classification Search
CPC .... B60L 58/12; B60L 58/26; B60L 2240/421; B60L 2240/441; B60L 2240/12;
(Continued)

(56) References Cited

U.S. PATENT DOCUMENTS 5,583,418 A * 12/1996 Honda ................. B60L 53/305
                                                              320/109
6,404,163 B1 * 6/2002 Kapsokavathis ..... H02J 7/0029
                                                              320/104
(Continued)

FOREIGN PATENT DOCUMENTS

JP         5505024      5/2014
JP       2016115557     6/2016
(Continued)

*Primary Examiner* — Helen Rossoshek
(74) *Attorney, Agent, or Firm* — Morgan, Lewis & Bockius LLP

(57) ABSTRACT

A system for controlling a state of charge (SOC) of a battery includes a battery SOC control apparatus for controlling a revolution per minute (RPM) of an air blower based on the SOC of the battery and a number of charge/discharge cycles of the battery in a case where a vehicle is in a constant current driving state, and a memory device for storing the SOC of the battery calculated by the battery SOC control apparatus.

5 Claims, 6 Drawing Sheets

(51) Int. Cl.
*H01M 10/44* (2006.01)
*H01M 16/00* (2006.01)
*H01M 8/04537* (2016.01)
*H01M 8/04746* (2016.01)
*B60L 50/72* (2019.01)
*B60L 58/40* (2019.01)
*B60L 50/75* (2019.01)

(52) U.S. Cl.
CPC ......... *B60L 58/40* (2019.02); *H01M 8/04626* (2013.01); *H01M 8/04753* (2013.01); *H01M 10/44* (2013.01); *H01M 16/006* (2013.01); *H01M 2220/20* (2013.01); *H01M 2250/20* (2013.01)

(58) Field of Classification Search
CPC ...... B60L 58/13; B60L 11/1861; B60L 50/72; B60L 58/40; B60L 1/003; B60L 53/665; B60L 2250/18; B60L 50/75; H02J 7/0021; H02J 2007/0067; H02J 7/0004; H02J 7/0008; H02J 7/0029; H02J 7/1446; Y02T 10/7077; Y02T 90/14; H01M 8/04626; H01M 8/04753; H01M 8/04089; H01M 10/44; H01M 16/006; H01M 2220/20; H01M 2250/20
See application file for complete search history.

(56) References Cited

U.S. PATENT DOCUMENTS

| | | | | |
|---|---|---|---|---|
| 6,603,277 B2 * | 8/2003 | Yoshimura | ................ | H02P 6/24 318/139 |
| 6,675,597 B2 * | 1/2004 | Ieda | ..................... | B60H 1/3207 165/204 |
| 6,840,055 B2 * | 1/2005 | Iritani | .................... | B60H 1/004 62/230 |
| 7,019,488 B2 * | 3/2006 | Nakao | .................. | B60L 3/0046 320/104 |
| 7,038,415 B2 * | 5/2006 | Nakamura | ......... | B60H 1/00428 318/432 |
| 7,110,877 B2 * | 9/2006 | Ozeki | ..................... | F02D 17/04 701/112 |
| 7,647,788 B2 * | 1/2010 | Okuda | ................ | H01M 10/486 429/62 |
| 8,030,883 B2 * | 10/2011 | Katayama | ............. | H02J 7/1453 320/104 |
| 8,041,470 B2 * | 10/2011 | Kyuma | .................... | F01P 7/08 123/41.48 |
| 8,084,156 B2 * | 12/2011 | Okuda | .................. | B60L 3/0046 429/120 |
| 8,217,620 B2 * | 7/2012 | Hanssen | .................. | B60K 6/48 320/104 |
| 8,329,351 B2 | 12/2012 | Yoshida et al. | | |
| 8,513,917 B2 * | 8/2013 | Gomi | ....................... | B62J 1/005 180/121 |
| 8,658,325 B2 | 2/2014 | Saeki | | |
| 8,863,540 B2 * | 10/2014 | Alston | ............... | B60H 1/00428 165/43 |
| 8,947,023 B2 * | 2/2015 | Kawahara | ........... | H01M 10/486 318/139 |
| 9,495,814 B2 * | 11/2016 | Ramesh | ................ | G07C 5/0808 |
| 9,573,488 B2 * | 2/2017 | Kim | ........................ | B60L 58/12 |
| 2006/0284601 A1 * | 12/2006 | Salasoo | .................... | B60K 6/28 320/150 |
| 2008/0280192 A1 * | 11/2008 | Drozdz | .................... | B60K 6/28 429/62 |
| 2010/0279187 A1 | 11/2010 | Yoshida et al. | | |
| 2011/0118919 A1 * | 5/2011 | Park | .................... | B60H 1/00392 701/22 |
| 2012/0051952 A1 | 3/2012 | Knoop et al. | | |
| 2012/0222438 A1 * | 9/2012 | Osaka | ................. | B60H 1/00271 62/126 |
| 2013/0241485 A1 * | 9/2013 | Snyder | .................... | B60L 58/15 320/109 |
| 2013/0300191 A1 * | 11/2013 | Takaoka | .................. | B60K 6/365 307/9.1 |
| 2014/0081497 A1 * | 3/2014 | Jeon | ................... | H01M 8/04753 701/22 |
| 2014/0368028 A1 * | 12/2014 | Kwon | .................... | B60L 3/0046 307/9.1 |
| 2014/0370333 A1 * | 12/2014 | Kwon | .................... | H01M 10/625 429/50 |
| 2015/0298523 A1 * | 10/2015 | Patel | .................... | B60H 1/00778 237/2 A |
| 2016/0006059 A1 * | 1/2016 | Kwon | ..................... | B60L 58/33 429/434 |
| 2016/0141673 A1 | 5/2016 | Kakeno et al. | | |
| 2016/0144737 A1 * | 5/2016 | Liu | ............................ | H02J 7/00 320/149 |
| 2016/0233563 A1 * | 8/2016 | Oshima | ............... | H01M 10/625 |
| 2016/0301119 A1 * | 10/2016 | Izumi | .................. | H01M 10/613 |
| 2017/0024937 A1 * | 1/2017 | Ramesh | ................... | B60L 58/12 |
| 2017/0166081 A1 * | 6/2017 | Kwon | ............... | H01M 8/04303 |
| 2019/0070974 A1 * | 3/2019 | Uetake | .................... | B60K 11/06 |
| 2019/0165398 A1 * | 5/2019 | Park | .................... | H01M 8/04947 |

FOREIGN PATENT DOCUMENTS

| | | | | |
|---|---|---|---|---|
| JP | 2017091602 A | * | 5/2017 | .......... H01M 10/613 |
| KR | 20160050475 | | 5/2016 | |

* cited by examiner

APPARATUS FOR CONTROLLING BATTERY STATE OF CHARGE, SYSTEM HAVING APPARATUS FOR CONTROLLING BATTERY STATE OF CHARGE, AND METHOD FOR CONTROLLING BATTERY STATE OF CHARGE

CROSS-REFERENCE TO RELATED APPLICATION

This application claims the benefit of priority to Korean Patent Application No. 10-2017-0053825, filed on Apr. 26, 2017 with the Korean Intellectual Property Office, the disclosure of which is incorporated herein in its entirety by reference.

TECHNICAL FIELD

The present disclosure relates to an apparatus for controlling a battery state of charge, a system having the same, and a method thereof, and more particularly, to a technique capable of flexibly controlling and compensating for a revolution per minute (RPM) of an air blower depending on the battery state of charge and the number of charge/discharge cycles of the battery.

BACKGROUND

In general, a revolution per minute (RPM) of an air blower increases or decreases to allow a state of charge (SOC) of a battery to become closer to, or approximate, a constant target value.

That is, in a case that the SOC of the battery does not converge to the target SOC value, the RPM of the air blower increases to perform a charge operation such that the SOC of the battery reaches, or approaches, the target SOC value. However, when the SOC of the battery is rapidly increased to exceed the target SOC value, the RPM of the air blower decreases to reduce the SOC of the battery.

Under this circumstance, when the RPM of the air blower is reduced, the SOC of the battery is rapidly decreased, thereby repeatedly causing frequent charging and discharging. Referring to FIG. 1, the charge and discharge of the battery occurs frequently.

When the generation of an electric energy is not as efficient as in the initial state due to changes in a state of health of the fuel cell stack, the number of charge and discharge cycles becomes greater since a relatively small amount of electric energy is generated with the same amount of air blown. As the number of unnecessary charge and discharge cycles increases, an efficiency of an entire battery system is deteriorated. Also, different drivers have different demands for rapid charges and discharges, and slow charges and discharges. However, with the conventional technology, it is difficult to control the charges and discharges depending on a driver's propensity.

SUMMARY

The present disclosure has been made to solve the above-mentioned problems occurring in the prior art while advantages achieved by the prior art are maintained intact.

An aspect of the present disclosure provides an apparatus for controlling a state of charge (SOC) of a battery, a system having the same, and a method thereof, which are capable of flexibly controlling and compensating for an RPM value of an air blower depending on the SOC of the battery and the number of charge/discharge times of the battery.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a system for controlling a state of charge of a battery includes a battery SOC control apparatus that controls a revolution per minute (RPM) of an air blower based on the SOC of the battery and a number of charge/discharge times of the battery in a case that a vehicle is in a constant current driving state and a memory device that stores information calculated by the battery SOC control apparatus.

The battery SOC control apparatus controls the RPM of the air blower such that the SOC of the battery reaches a target value of the SOC of the battery in a case that the vehicle is not in the constant current driving state.

The case that the vehicle is not in the constant current driving state includes a state in which a driver intends to accelerate or decelerate the vehicle.

The battery SOC control apparatus increases the RPM of the air blower by a first compensation value when the calculated SOC of the battery is equal to or smaller than a first reference value, sets the RPM of the air blower to a fixed second compensation value when the calculated SOC of the battery is greater than the first reference value and smaller than a second reference value, and decreases the RPM of the air blower by a third compensation value when the calculated SOC of the battery is equal to or greater than the second reference value.

The battery SOC control apparatus decreases the first compensation value and the second compensation value by a predetermined correction value when controlling the RPM of the air blower in a case that the number of charge/discharge times is equal to or greater than a predetermined number of times.

The battery SOC control apparatus controls the RPM of the air blower by decreasing the first compensation value and the second compensation value by the predetermined correction value and decreases the third compensation value and a fourth compensation value, which are decreased by the correction value, again by the correction value in the case that the constant current driving state is continuously maintained and the number of charge/discharge times is equal to or greater than the predetermined number of times.

The battery SOC control apparatus increases the number of charge/discharge times by one (1) when the number of charge/discharge times is equal to or smaller than the predetermined number of times and continuously controls the SOC of the battery.

The battery SOC control apparatus includes a driving state determination device that determines whether the vehicle is in the constant current driving state, a battery SOC calculation device that calculates the SOC of the battery, a battery SOC determination device that determines whether the SOC of the battery is within a predetermined range, and an RPM control device that controls the RPM of the air blower depending on a determined result by the battery SOC determination device and the number of charge/discharge times of the battery when the vehicle is in the constant current driving state.

The RPM control device initializes the number of charge/discharge times and controls the RPM of the air blower depending on the determined result by the battery SOC determination device in a case that the vehicle is not in the constant current driving state according to a determined result by the driving state determination device.

According to another aspect of the present disclosure, an apparatus for controlling a state of charge (SOC) of a battery, includes a driving state determination device that determines whether a vehicle is in a constant current driving state, a battery SOC calculation device that calculates the SOC of the battery, a battery SOC determination device that determines whether the SOC of the battery is within a predetermined range, and an RPM control device that controls a revolution per minute (RPM) of an air blower depending on a determined result by the battery SOC determination device and a number of charge/discharge times of the battery when the vehicle is in the constant current driving state.

The battery SOC determination device compares the calculated SOC of the battery with a first reference value and a second reference value greater than the first reference value to determine whether the SOC of the battery is within the predetermined range.

The RPM control device increases the RPM of the air blower by a first compensation value when the calculated SOC of the battery is equal to or smaller than a first reference value, sets the RPM of the air blower to a fixed second compensation value when the calculated SOC of the battery is greater than the first reference value and smaller than a second reference value, and decreases the RPM of the air blower by a third compensation value when the calculated SOC of the battery is equal to or greater than the second reference value.

The RPM control device decreases the first compensation value and the second compensation value by a predetermined correction value when controlling the RPM of the air blower in a case that the number of charge/discharge times is equal to or greater than a predetermined number of times.

The RPM control device controls the RPM of the air blower by decreasing the first compensation value and the second compensation value by the predetermined correction value and decreases the third compensation value and a fourth compensation value, which are decreased by the correction value, again by the correction value in the case that the constant current driving state is continuously maintained and the number of charge/discharge times is equal to or greater than the predetermined number of times.

According to another aspect of the present disclosure, a method for controlling a state of charge (SOC) of a battery, includes calculating the SOC of the battery, setting a revolution per minute (RPM) of an air blower depending on the SOC of the battery, and compensating for the RPM of the air blower based on a number of charge/discharge times of the battery when a vehicle is in a constant current driving state.

The setting the RPM of the air blower depending on the SOC of the battery includes increasing the RPM of the air blower by a first compensation value when the calculated SOC of the battery is equal to or smaller than a first reference value, setting the RPM of the air blower to a fixed second compensation value when the calculated SOC of the battery is greater than the first reference value and smaller than a second reference value, and decreasing the RPM of the air blower by a third compensation value when the calculated SOC of the battery is equal to or greater than the second reference value.

The compensating for the RPM of the air blower includes decreasing the first compensation value and the second compensation value by a predetermined correction value when controlling the RPM of the air blower in a case that the number of charge/discharge times is equal to or greater than a predetermined number of times.

The RPM of the air blower is controlled by decreasing the first compensation value and the second compensation value by the predetermined correction value, and the third compensation value and a fourth compensation value, which are decreased by the correction value, decrease again by the correction value in the case that the constant current driving state is continuously maintained and the number of charge/discharge times is equal to or greater than the predetermined number of times.

The method further includes determining whether the vehicle is in the constant current driving state.

The method further includes, in a case that the vehicle is not in the constant current driving state, initializing the number of charge/discharge times and controlling the RPM of the air blower depending on the SOC of the battery regardless of the number of charge/discharge times.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
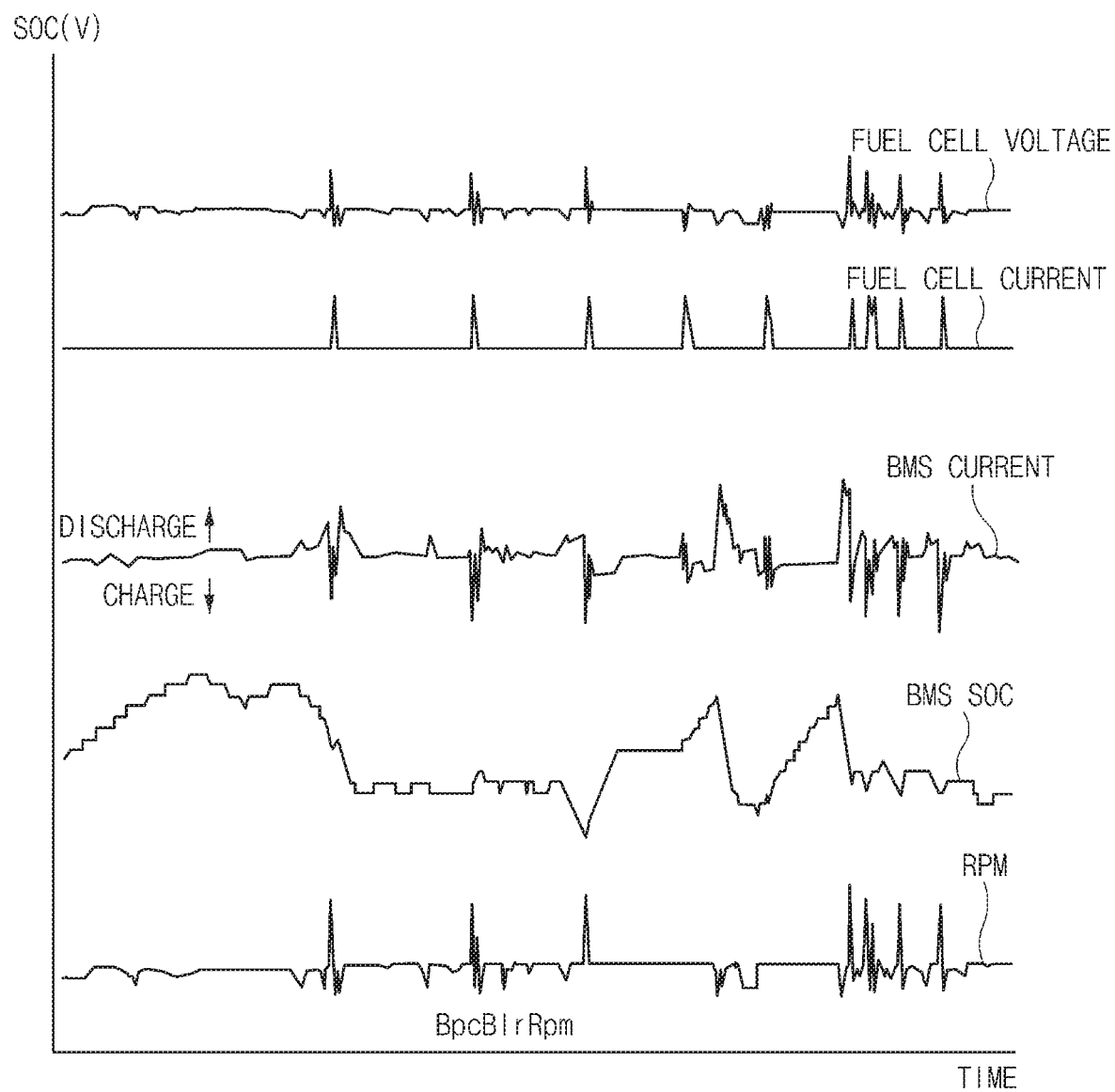
FIG. 1 is a graph illustrating a variation of an SOC of a battery when a conventional technology for controlling the SOC of the battery is applied according to the related art.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be omitted in order to not unnecessarily obscure the concepts of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, exemplary embodiments of the present disclosure will be described in detail with reference to FIGS. 2 to 6.

Figure 2:
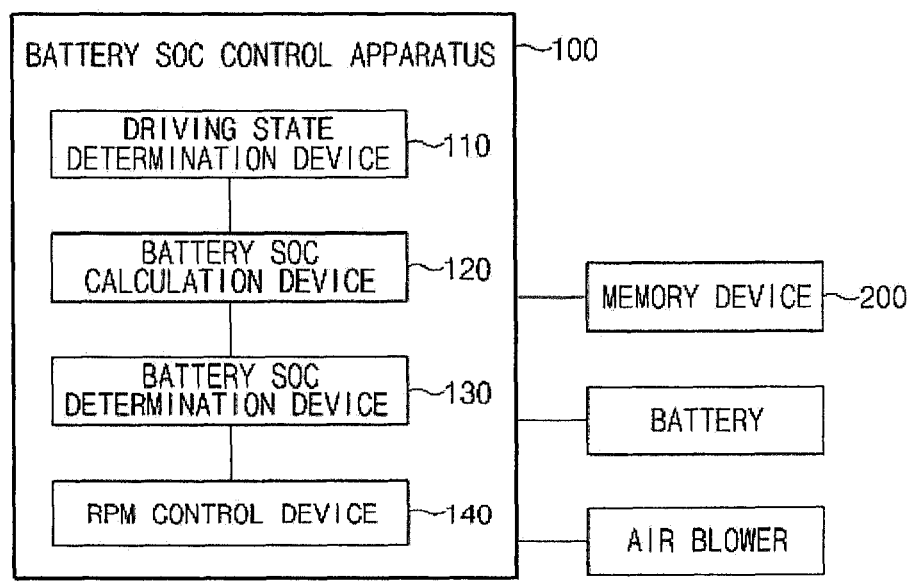
FIG. 2 is a block diagram illustrating a system for controlling an SOC of a battery according to exemplary embodiments of the present disclosure.

FIG. 2 is a block diagram illustrating a system for controlling a state of charge (hereinafter, referred to as an "SOC") of a battery according to exemplary embodiments of the present disclosure.

The control system of the SOC of the battery according to exemplary embodiments of the present disclosure may include an apparatus for controlling the SOC of the battery (hereinafter, referred to as a "battery SOC control apparatus") 100 and a memory device 200.

The battery SOC control apparatus 100 may control a revolution per minute (hereinafter, referred to as an "RPM") of an air blower depending on the SOC of the battery and the number of charge/discharge times, or cycles, of the battery during a constant current drive.

That is, the battery SOC control apparatus 100 may control the RPM of the air blower to provide a fuel cell system with an air such that the SOC of the battery converges to a target value of the SOC of the battery. In this case, when the RPM of the air blower increases while an amount of hydrogen supplied into the fuel cell system is constant, an air flow rate into the fuel cell system may increase, and an amount of electrical energy generated from the fuel cell system may increase. On the contrary, when the RPM of the air blower decreases, the air flow rate into the fuel cell system may decrease, and the amount of electrical energy generated from the fuel cell system may decrease.

To this end, the battery SOC control apparatus 100 may include a driving state determination device 110, a battery SOC calculation device 120, a battery SOC determination device 130 and an RPM control device 140.

The driving state determination device 110 may determine whether a vehicle is currently in a constant current driving state in which the vehicle drives at a constant speed or in a rapid acceleration or deceleration driving state. That is, the constant current driving state may indicate the state in which the vehicle drives at the constant speed, and the driving state may be changed to the rapid acceleration or deceleration driving state when a driver presses an accelerator pedal or a brake pedal during the constant current driving state.

The battery SOC calculation device 120 may calculate the SOC of the battery. In this case, a method for calculating the SOC of the battery may be carried out by using conventional techniques. The SOC of the battery may be differently calculated in the constant current driving state and the rapid acceleration or deceleration driving state, and although the vehicle is in the constant current driving state, the SOC of the battery may be differently calculated when the speed of the vehicle is changed. For instance, the SOC of the battery calculated when a driver "A" drives the vehicle at a speed of about 50 km/h in the constant current driving state may be different from the SOC of the battery calculated when a driver "B" drives the vehicle at a speed of about 20 km/h in the constant current driving state. Thus, the RPM of the air blower of the vehicle driven by the A driver may be differently set from the RPM of the air blower of the vehicle driven by the B driver.

The battery SOC determination device 130 may determine whether the calculated SOC of the battery is within a predetermined range.

The RPM control device 140 may increase the RPM of the air blower by a first compensation value in a case where the calculated SOC of the battery is equal to or smaller than a first reference value, set the RPM of the air blower to a second compensation value that is a fixed value in a case where the calculated SOC of the battery is greater than the first reference value and smaller than a second reference value, and decrease the RPM of the air blower by a third compensation value in a case where the calculated SOC of the battery is equal to or greater than the second reference value. That is, the RPM control device 140 may increase or decrease the RPM of the air blower such that the calculated SOC of the battery reaches a previously-determined target value of the SOC of the battery.

In addition, the RPM control device 140 may control the RPM of the air blower, which is set depending on the SOC of the battery, based on the number of charge/discharge times, or cycles, during the constant current driving state.

That is, in a case that the number of charge/discharge cycles is equal to or greater than a predetermined number of cycles, the RPM control device 140 may decrease the first compensation value and the second compensation value by a predetermined correction value ($\alpha\%$) to respectively set the third compensation value and a fourth compensation value when controlling the RPM of the air blower.

In addition, after the RPM control device 140 decreases the first compensation value and the second compensation value by the predetermined correction value ($\alpha\%$) to control the RPM of the air blower, the RPM control device 140 may again decrease the third compensation value and the fourth compensation value, which are decreased by the correction value ($\alpha\%$), by the correction value ($\alpha\%$) in a case that the constant current driving state is continuously maintained and the number of charge/discharge cycles of the battery is equal to or greater than the predetermined number of cycles. The RPM control device 140 may repeatedly perform the operation to decrease the compensation value by the correction value ($\alpha\%$) in the case that the constant current driving state is maintained.

Meanwhile, the RPM control device 140 may continuously perform the control of the SOC of the battery after increasing the number of charge/discharge cycles by one "1" in the case that the number of charge/discharge cycles of the battery is smaller than the predetermined number of cycles.

The memory device 200 may store information calculated by the battery SOC control apparatus 100. That is, the memory device 200 may store the calculated SOC of the battery, the reference value for comparison with the SOC of the battery, the target value of the SOC of the battery, and a critical value of the number of charge/discharge cycles.

As described above, the battery SOC control apparatus according to the present disclosure may control the RPM of the air blower to allow the calculated SOC of the battery to reach the target value of the SOC of the battery in the case that the vehicle is not in the constant current driving state and may decrease an adjustment width of the RPM of the air blower based on the number of charge cycles of the battery when the RPM of the air blower controlled by the SOC of the battery is controlled in the case that the vehicle is in the constant current driving state. Thus, the number of charge/discharge cycles of the battery may be reduced by controlling the SOC of the battery to allow the SOC of the battery not to quickly reach the target value of the SOC of the battery.

For instance, in a case that the target value of the SOC of the battery is about 60 and the calculated SOC of the battery is about 40, when the RPM of the air blower increases to allow the SOC of the battery to be about 60, the SOC of the battery may increase by about 20 or above and exceed the target value, i.e., about 60, of the SOC of the battery. Then, the RPM of the air blower may decrease to reduce the SOC of the battery, and thus the charge and discharge operations may be repeatedly performed. In the present disclosure, in a case that the SOC of the battery is about 40 and the number of charge/discharge cycles of the battery exceeds ten, which is the predetermined critical value of the number of charge/discharge times, in the constant current driving state, the SOC of the battery may be controlled to allow the SOC of the battery to increase by about 5 instead of increasing by about 20. Accordingly, the SOC of the battery may be controlled not to quickly reach the target value of the SOC of the battery, and thus the discharge of the battery, which is caused when the SOC of the battery quickly reaches the target value of the SOC of the battery, may be delayed.

However, since a charge/discharge of the battery is required in the case that the driver intends to rapidly accelerate or decelerate the vehicle, the battery SOC control apparatus 100 according to the present disclosure may allow an increase/decrease amount of the RPM of the air blower depending on the number of charge/discharge cycles of the battery to be reduced only during the constant current driving state.

Figure 3:
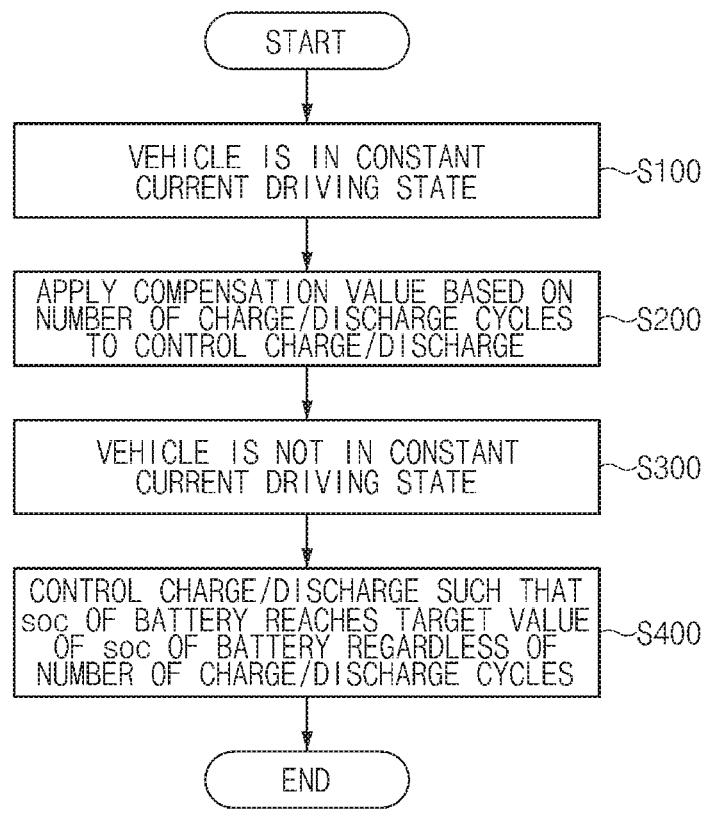
FIG. 3 is a flowchart illustrating a method for controlling the SOC of the battery according to exemplary embodiments of the present disclosure.

Hereinafter, a method for controlling the SOC of the battery according to exemplary embodiments of the present disclosure will be described with reference to FIG. 3.

When the vehicle is in the constant current driving state (S100), the battery SOC control apparatus 100 may decrease the compensation value of the RPM of the air blower, which is used to control the SOC of the battery, based on the number of charge/discharge cycles to control the charge/discharge of the battery (S200).

Then, in a case that the vehicle is not in the constant current driving state (S300), the battery SOC control apparatus 100 may control the RPM of the air blower such that the SOC of the battery reaches the target value of the SOC of the battery regardless of the number of charge/discharge cycles of the battery to control the charge/discharge of the battery (S400).

That is, the battery SOC control apparatus 100 according to the present disclosure may increase or decrease the RPM of the air blower depending on the calculated SOC of the battery to control the SOC of the battery such that the SOC of the battery reaches the target value of the SOC of the battery while the vehicle is not in the constant current driving state and may reduce the increase/decrease amount of the RPM of the air blower according to the SOC of the battery, by taking into account the number of charge/discharge cycles while the vehicle is in the constant current driving state. Thus, a time point at which the SOC of the battery reaches the target value of the SOC of the battery may be delayed, and the number of the charge/discharge cycles of the battery may be minimized.

Figure 4:
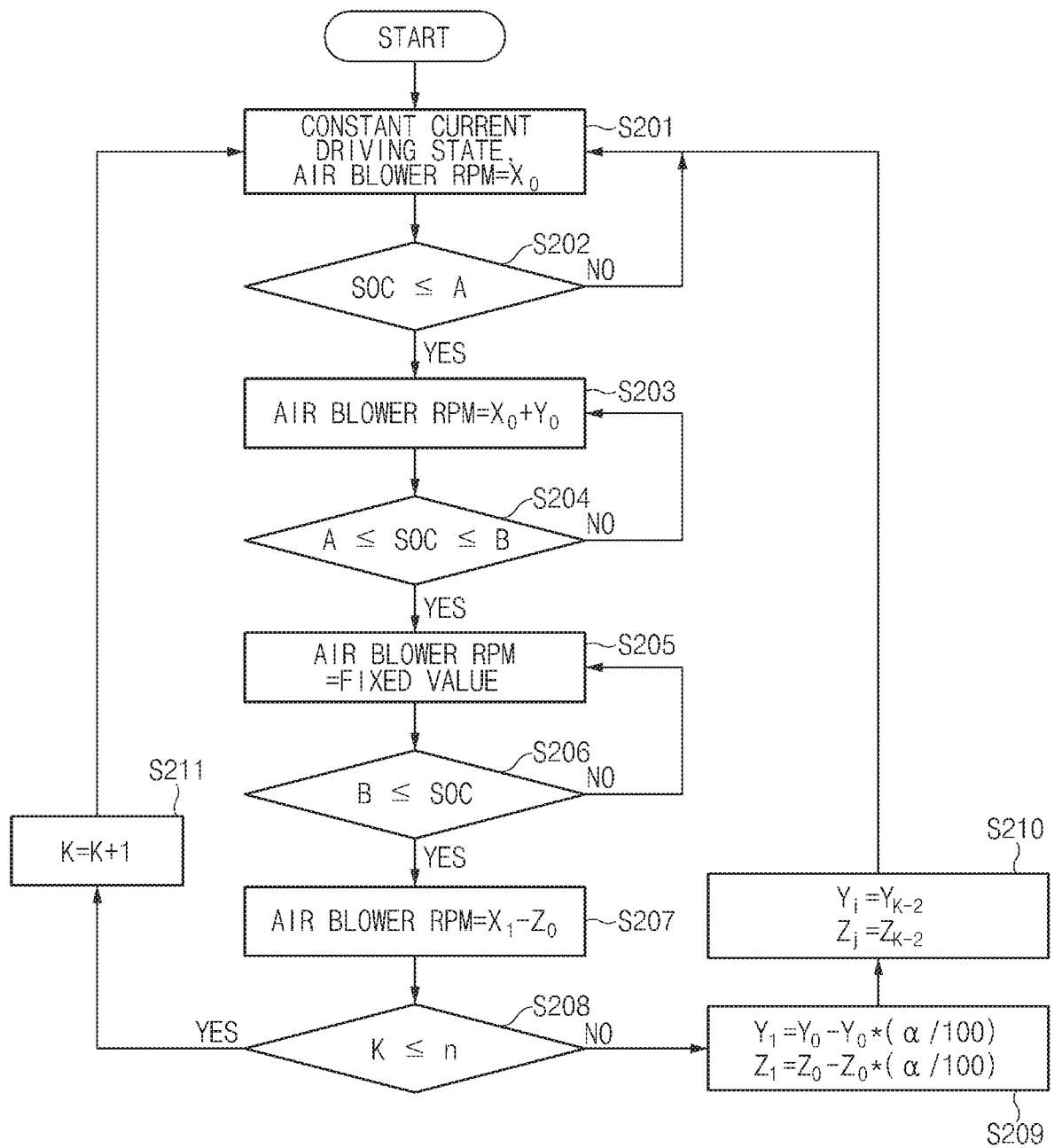
FIG. 4 is a flowchart illustrating a method for controlling the SOC of the battery during a constant current drive according to exemplary embodiments of the present disclosure.

Hereinafter, a method for controlling the SOC of the battery during the constant current drive according to exemplary embodiments of the present disclosure will be described with reference to FIG. 4.

First, the RPM of the air blower during the constant current driving state is referred to as "$X_0$" (S201).

The battery SOC control apparatus 100 may calculate the SOC of the battery to determine whether the SOC of the battery is equal to or smaller than the first reference value "A" (S202).

When the SOC of the battery is equal to or smaller than the first reference value "A", the battery SOC control apparatus 100 may increase the RPM of the air blower by a first compensation value $Y_0$ (S203). That is, the RPM of the air blower may increase by the first compensation value $Y_0$ to control the calculated SOC of the battery such that the calculated SOC of the battery reaches the target value of the SOC of the battery in the case that the calculated SOC of the battery does not reach the predetermined target value of the SOC of the battery.

The battery SOC control apparatus 100 may determine whether the calculated SOC of the battery is greater than the first reference value "A" and smaller than the second reference value "B" (S204). When the calculated SOC of the battery is greater than the first reference value "A" and smaller than the second reference value "B", the battery SOC control apparatus 100 may set the RPM of the air blower as the fixed second compensation value (S205).

In addition, the battery SOC control apparatus 100 may determine whether the calculated SOC of the battery is equal to or greater than the second reference value "B" (S206). When the calculated SOC of the battery is equal to or greater than the second reference value "B", the battery SOC control apparatus 100 may decrease the RPM of the air blower by the third compensation value $Z_0$ (S207). That is, the RPM of the air blower may decrease by the third compensation value $Z_0$ to control the calculated SOC of the battery such that the target value of the SOC of the battery decreases to the target value of the SOC of the battery in the case that the calculated SOC of the battery exceeds the predetermined target value of the SOC of the battery.

In a case that the constant current driving state is continuously maintained, the battery SOC control apparatus 100 may determine whether the number "K" of charge/discharge cycles of the battery is equal to or greater than the predetermined number of cycles "n" (S208).

When the number "K" of charge/discharge cycles of the battery is smaller than the predetermined number of cycles "n", the battery SOC control apparatus 100 may increase the number of charge/discharge cycles by one "1" (S211) and return to the operation S201.

Meanwhile, when the number "K" of charge/discharge cycles of the battery is equal to or greater than the predetermined number of cycles "n", the battery SOC control apparatus 100 may decrease the first compensation value $Y_0$ and the third compensation value $Z_0$ by the predetermined correction value ($\alpha$%) and apply the decreased first and third compensation values $Y_0$ and $Z_0$ to the control of the RPM of the air blower (S209 and S210).

The corrected compensation value may be expressed by the following Equations 1 and 2.

$$Y_1 = Y_0 - Y_0 * (\alpha/100) \qquad \text{[Equation 1]}$$

A fourth compensation value $Y_1$ may correspond to a value obtained by subtracting a value, which is obtained by multiplying the first compensation value $Y_0$ by the correction value ($\alpha$%), from the first compensation value $Y_0$.

$$Z_1 = Z_0 - Z_0 * (\alpha/100) \qquad \text{[Equation 2]}$$

A fifth compensation value $Z_1$ may correspond to a value obtained by subtracting a value, which is obtained by multiplying the second compensation value $Z_0$ by the correction value ($\alpha$%), from the second compensation value $Z_0$.

As described above, in the case that the number of charge/discharge cycles is equal to or greater than the predetermined number of times "n", a compensation amount may be continuously controlled to be decreased by the correction value ($\alpha$%) such that the increase/decrease amount of the RPM of the air blower becomes small.

Then, in the case that the vehicle is not in the constant current driving state but in the rapid acceleration or deceleration driving state, the battery SOC control apparatus 100 may delete the fourth compensation value and the fifth compensation value and initialize the compensation value with the first to third compensation values to control and set the RPM of the air blower.

In the case that the charge and discharge operations of the battery are repeated more than "n" cycles, the compensation amount with respect to the increase and decrease of the RPM of the air blower may be reduced by a certain percentage ($\alpha$). Since the number of charge/discharge cycles of the battery gradually increases as the SOC of the battery converges to the target value of the SOC of the battery, the certain percentage of the compensation amount with respect to the increase/decrease of the RPM of the battery, which is the certain percentage, may be repeatedly applied.

Through the above-mentioned process, a charge/discharge cycle of the battery may become longer, and the number of charge/discharge cycles may be reduced. Accordingly, unnecessary charge and discharge operations of the battery may be reduced and an energy exchange between a fuel cell stack and the battery may be reduced. As a result, an overall battery system efficiency may increase.

When the vehicle is out of the constant current driving state, the compensation amount ($\alpha$) may be deleted, and the RPM of the air blower may return to the first compensation value $Y_0$ and the third compensation value $Z_0$. Accordingly, the RPM of the air blower may be changed in response to driver's acceleration and deceleration demands.

In addition, the battery SOC control apparatus 10 may compensate for the RPM of the air blower in response to changes in an SOH (state of health) of the fuel cell stack due to changes in external conditions, such as a temperature, a vehicle stopping time, a vehicle driving time and a driving state, etc.

Figure 5:
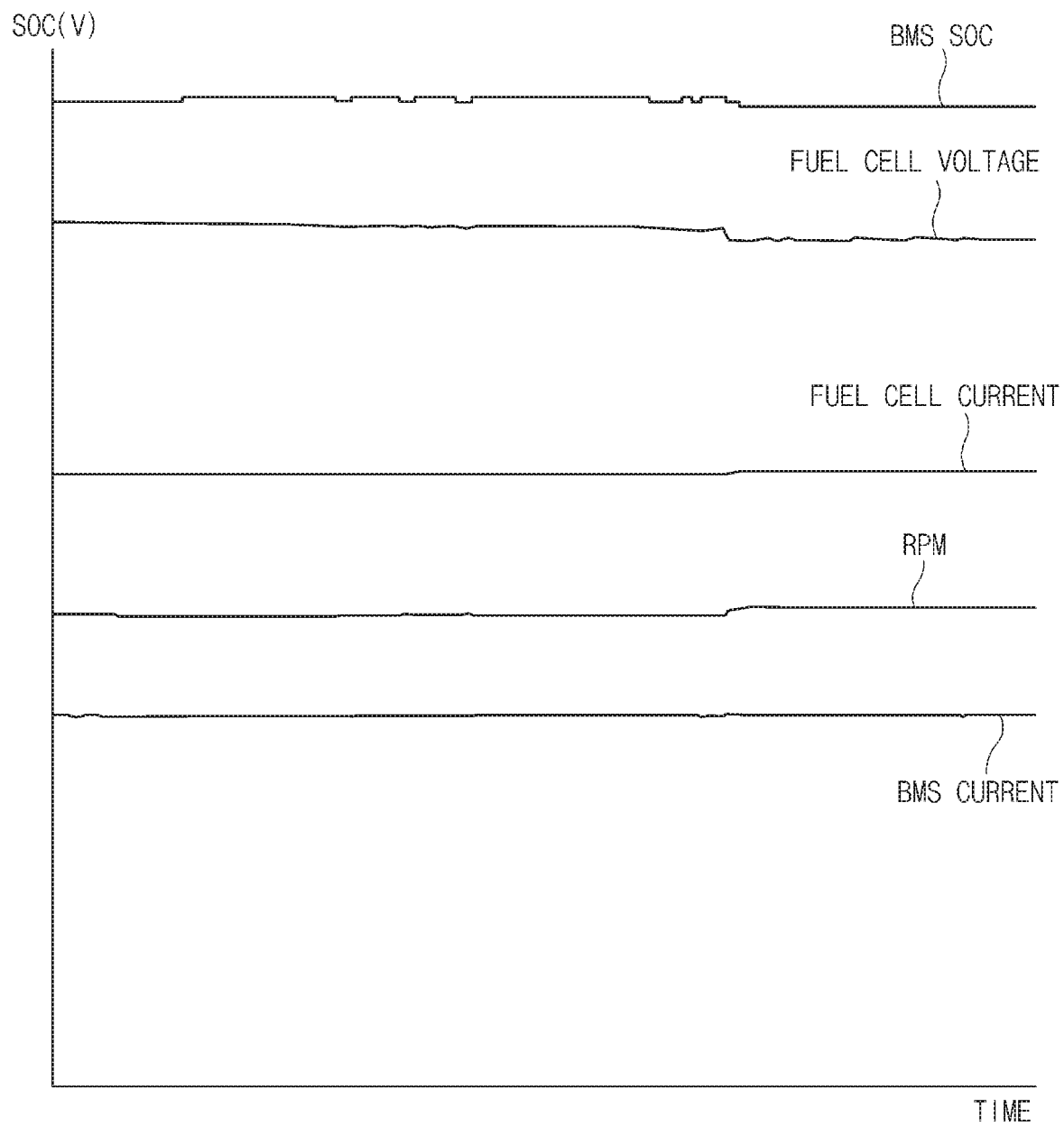
FIG. 5 is a graph illustrating a variation of an SOC of a battery according to exemplary embodiments of the present disclosure.

FIG. 1 is a graph illustrating a variation of a SOC of a battery when a conventional technology for controlling the SOC of the battery is applied, and FIG. 5 is a graph illustrating a variation of an SOC of a battery according to exemplary embodiments of the present disclosure.

Referring to FIG. 1, a value of a battery management system (BMS) current and a value of a BMS SOC are continuously changed. This means that the charge and discharge operations of the battery are repeated. As shown in FIG. 5, each of the BMS current and the BMS SOC are maintained at a constant value, and this means that the charge and discharge operations of the battery are not frequent.

As described above, according to the present disclosure, the SOC of the battery follows the target value of the SOC of the high voltage battery, but the compensation value of the RPM of the air blower is limited in the case that the charge and discharge operations are repeated more than the "n" number of battery charge cycles. Accordingly, unnecessary charge and discharge operations may be prevented from being performed.

According to the present disclosure, since the unnecessary charge and discharge operations of the high voltage battery may be reduced, the charge and discharge efficiency of the high voltage battery may be improved and a mileage of the vehicle may be improved.

In addition, the high voltage battery may be charged and discharged according to the SOH of the fuel cell stack and driver's driving habits, and thus system efficiency may be improved.

When the driver rapidly accelerates or decelerates the vehicle, the SOC of the battery is required to be quickly charged or discharged depending on an energy demand amount, and when the driver drives the vehicle in the constant current driving state, the energy demand amount may be reduced. Accordingly, the battery is controlled to be quickly charged or discharged or to reduce the number of charge/discharge cycles according to the driver's propensity, and thus the RPM of the air blower may be controlled based on the driver's propensity.

In addition, a surplus energy remaining after the fuel cell system generates more energy than necessary may be charged in the high voltage battery, and in this case, an energy loss may occur when the energy generated by the fuel cell stack is converted to battery energy. On the contrary, in a case where the energy of the fuel cell system is not enough, the energy charged in the battery may be used, and in this case, the energy loss may occur due to the energy conversion. As a method for increasing the system efficiency due to the above-mentioned energy conversion, a method that maintains the constant SOC of the battery to prevent unnecessary charge and discharge operations from occurring may be used. In the present disclosure, the number of charge/discharge times of the battery may be reduced, and the efficiency of the battery system may be improved.

Figure 6:
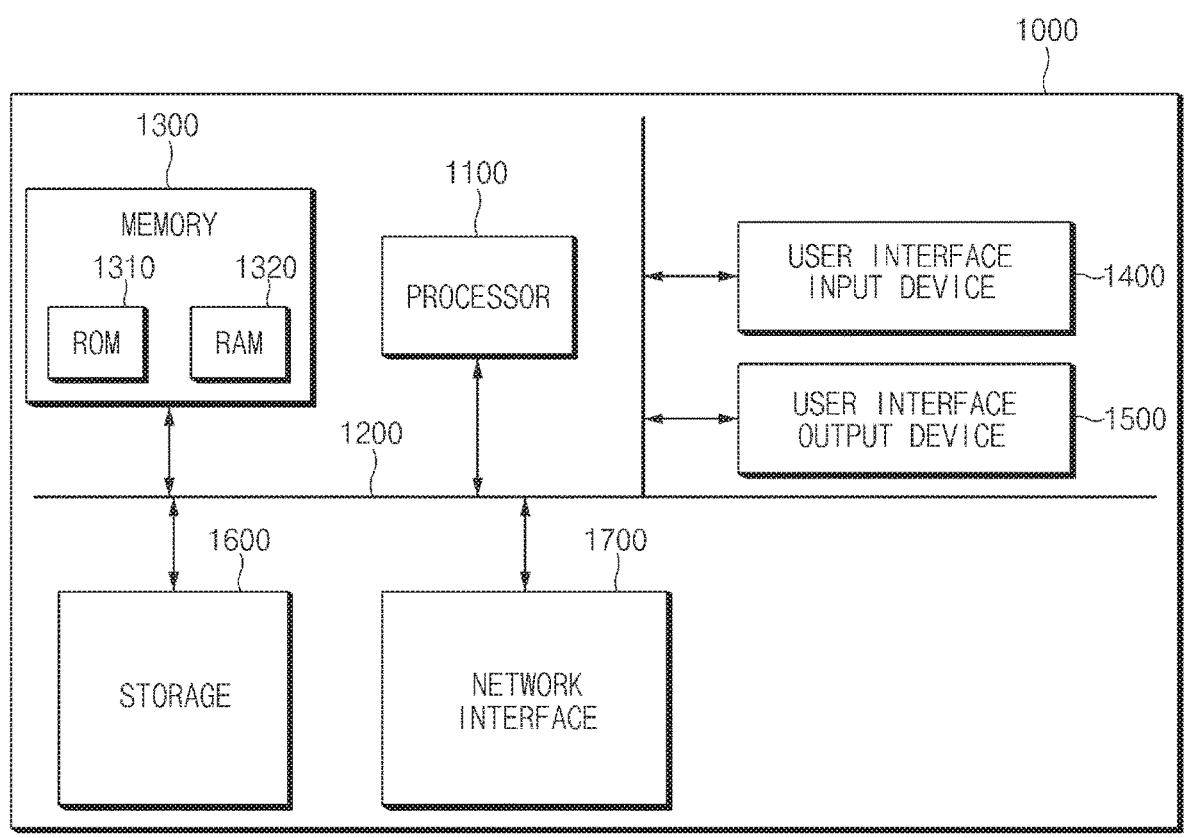
FIG. 6 is a schematic block diagram illustrating a configuration of a computing system to which a technique for controlling the SOC of the battery is applied according to exemplary embodiments of the present disclosure.

FIG. 6 is a schematic block diagram illustrating a configuration of a computing system 1000 to which a technique for controlling the SOC of the battery is applied according to exemplary embodiments of the present disclosure.

Referring to FIG. 6, the computing system 1000 may include at least one processor 1100, a memory 1300, a user interface input device 1400, a user interface output device 1500, a storage 1600 and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal. Further, the battery SOC control apparatus 100 may be implemented with a hardware processor and instructions, and the execution of the instructions causes the processor to perform various functions related to SOC control, including those described above.

According to the above, the present technique flexibly controls and compensates for the revolution per minute (RPM) of the air blower depending on the state of charge of the high voltage battery and the number of charge/discharge cycles of the high voltage battery. Thus the unnecessary charge/discharge cycles of the battery may be reduced, and the system efficiency may be improved.

In addition, the present technique may control the RPM of the air blower depending on a driving tendency of the driver.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The protection scope of the present disclosure should be interpreted by the following claims, and it should be interpreted that all technical spirits within a scope equivalent thereto are included in the scope of the present disclosure.

What is claimed is:

1. An apparatus for controlling a state of charge (SOC) of a battery, comprising:
    a driving state determination device for determining whether a vehicle is in a constant current driving state;
    a battery SOC calculation device for calculating the SOC of the battery;
    a battery SOC determination device for determining whether the SOC of the battery is within a predetermined range; and
    an RPM control device for controlling a revolution per minute (RPM) of an air blower depending on a determined result by the battery SOC determination device and a number of charge/discharge cycles of the battery when the vehicle is in the constant current driving state,
    wherein the RPM control device controls the RPM of the air blower such that the SOC of the battery reaches a target value of the SOC of the battery in a case where the vehicle is not in the constant current driving state, and reduces an increase/decrease amount of the RPM of the air blower based on the number of charge/discharge cycles of the battery when the vehicle is in the constant current driving state, and
    wherein the RPM control device:
    increases the RPM of the air blower by a first compensation value when the calculated SOC of the battery is equal to or smaller than a first reference value,
    sets the RPM of the air blower to a fixed second compensation value when the calculated SOC of the battery is greater than the first reference value and smaller than a second reference value, and
    decreases the RPM of the air blower by a third compensation value when the calculated SOC of the battery is equal to or greater than the second reference value.

2. The apparatus of claim 1, wherein the battery SOC determination device compares the calculated SOC of the battery with the first reference value and the second reference value, the second reference value being greater than the first reference value, and determining whether the SOC of the battery is within the predetermined range.

3. The apparatus of claim 1, wherein the RPM control device decreases the first compensation value and the second compensation value by a predetermined correction value when controlling the RPM, of the air blower in a case that the number of charge/discharge cycles is equal to or greater than a predetermined number of cycles.

4. The apparatus of claim 3, wherein the RPM control device controls the RPM of the air blower by decreasing the first compensation value and the second compensation value by the predetermined correction value and decreases the third compensation value and a fourth compensation, value, which are decreased by the correction value, again by the correction value in the case that the constant current driving state is continuously maintained and the number of charge/discharge; cycles is equal to or greater than the predetermined number of cycles.

5. The apparatus of claim 1, wherein the RPM control device initializes the number of charge/discharge cycles and controls the RPM of the air blower depending on the determined result by the battery SOC determination device when the vehicle is not in the constant current driving state according to a determined result by the driving state determination device.

* * * * *